(12) United States Patent  
Selvaraj

(10) Patent No.: US 7,219,115 B2  
(45) Date of Patent: May 15, 2007

(54) METHOD FOR STABLE AND ACCURATE SOLUTION FOR AN ILL-CONDITIONED SYSTEM OF NORMAL EQUATIONS ASSOCIATED WITH A PREDICTION FILTER WHOSE OUTPUT IS DEFINED AS A TIME ADVANCED VERSION OF THE INPUT

(75) Inventor: Joseph Bernard Selvaraj, Hyderabad (IN)

(73) Assignee: Council of Scientific & Industrial Research, New Delhi (IN)

( * ) Notice: Subject to any disclaimer, the term of this patent is extended or adjusted under 35 U.S.C. 154(b) by 626 days.

(21) Appl. No.: 10/397,364

(22) Filed: Mar. 27, 2003

(65) Prior Publication Data

US 2004/0059763 A1    Mar. 25, 2004

Related U.S. Application Data

(60) Provisional application No. 60/368,397, filed on Mar. 28, 2002.

(51) Int. Cl.  
*G06F 7/38* (2006.01)

(52) U.S. Cl. .................................................... 708/446

(58) Field of Classification Search ............... 708/200, 708/422–446  
See application file for complete search history.

(56) References Cited

U.S. PATENT DOCUMENTS

| | | | |
|---|---|---|---|
| 5,287,529 A * | 2/1994 | Pentland | 708/446 |
| 5,717,621 A * | 2/1998 | Gupta et al. | 708/446 |
| 5,864,786 A * | 1/1999 | Jericevic | 708/446 |
| 6,879,735 B1 * | 4/2005 | Portniaguine et al. | 382/275 |
| 2002/0065664 A1 * | 5/2002 | Witzgall et al. | 704/500 |

\* cited by examiner

*Primary Examiner*—Mary Gutman  
*Assistant Examiner*—Chat C. Do  
(74) *Attorney, Agent, or Firm*—Sughrue Mion, PLLC

(57) ABSTRACT

A method for obtaining a stable and accurate solution for an ill-conditioned system of normal equations associated with digital Weiner filter for a time invariant system and/or an autoregressive operator of an autoregressive model. A time invariant stochastic model, uses a Gram_Schmidt process of orthonormalisation to condition the coefficient matrix, a singular matrix associated with such a system of normal equations, to an identity matrix. The observed output of the digital Weiner filter and/or autoregressive operator is defined as a time advanced version of the input. The method has application in situations where digitized data at smaller sampling intervals are made available.

15 Claims, 5 Drawing Sheets

Spectra for copper mineralization data by 'A' MEM (YW) based on the A.R. Parameters determined from an ill-conditioned system of normal equations and 'B' MEM (YW) based on the A.R. Parameters obtained employing Gram-Schmidt process.

Figure 1:
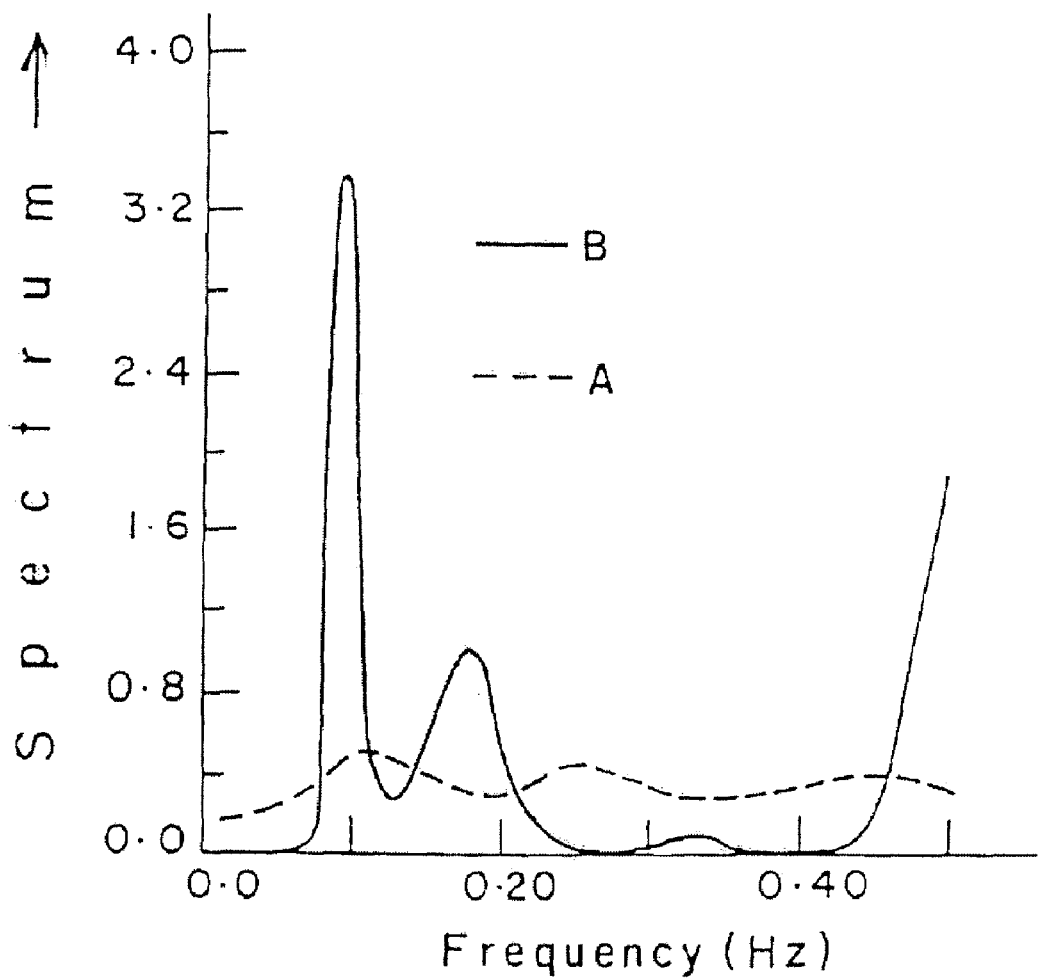

Fig. 1.: Spectra for synthetic data by 'A' MEM YW) based on the A.R. Parameters determined from an ill-conditioned system of normal equations and 'B' MEM (YW) based on the A.R. Parameters obtained employing Gram-Schmidt process.

Figure 2:
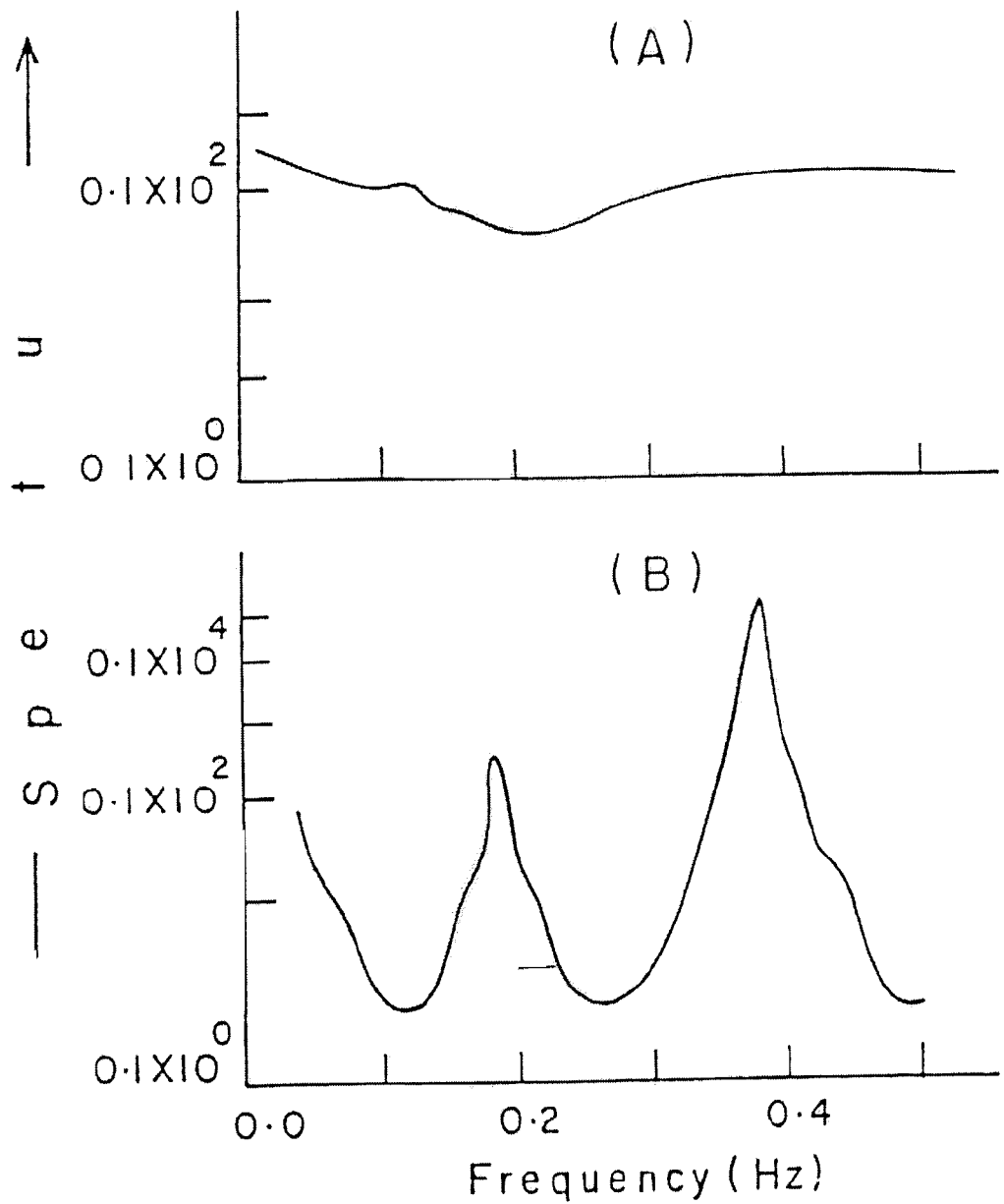

Fig. 2.: Spectra for copper mineralization data by 'A' MEM (YW) based on the A.R. Parameters determined from an ill-conditioned system of normal equations and 'B' MEM (YW) based on the A.R. Parameters obtained employing Gram-Schmidt process.

Figure 3:
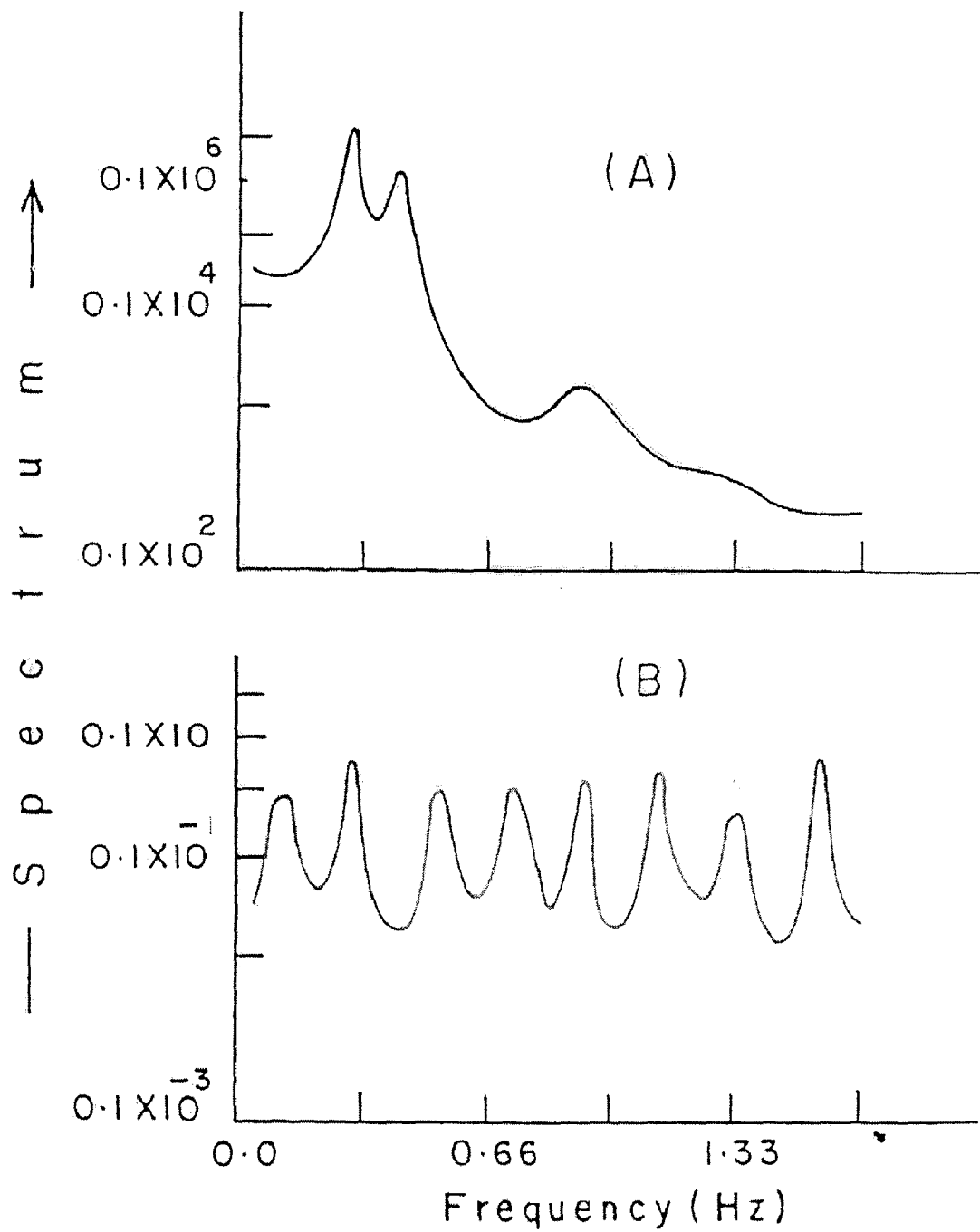

Fig. 3: Spectra for gravity data by 'A' MEM (YW) based on the A. R. Parameters determined from an ill conditioned system of normal equations and 'B' MEM (YW) based on the A. R. Parameters obtained employing Gram-Schmidt process.

FLOW – CHART: Shows a sequence of steps in the said method to condition an ill conditioned matrix of an ill conditioned system of normal equations associated with digital Wiener filter in the time domain.

METHOD FOR STABLE AND ACCURATE SOLUTION FOR AN ILL-CONDITIONED SYSTEM OF NORMAL EQUATIONS ASSOCIATED WITH A PREDICTION FILTER WHOSE OUTPUT IS DEFINED AS A TIME ADVANCED VERSION OF THE INPUT

This application claims benefit of Provisional Application No. 60/368,397 filed Mar. 28, 2002; the disclosure of which is incorporated herein by reference.

FIELD OF THE INVENTION

The invention relates to a method for obtaining a stable and accurate solution for an ill-conditioned system of normal equations associated with the prediction filter whose observed output is defined as a time advanced version of the input. More particularly, this invention relates to a method for determining the digital Weiner filter and/or autoregressive operator for time-invariant digitized data relating to reflection seismic, gravity, magnetic, resistivity, electromagnetic and magnetotelluric used for prospecting of oil, mineral and water.

BACKGROUND AND PRIOR ART REFERENCES

Calculating the prediction filter, viz., digital Weiner filter's autoregressive operator for accurately describing a time-invariant geophysical system is of considerable importance. Obtaining a stable and accurate solution for an ill-conditioned system of normal equations assocaited with prediction filter viz. digital Weiner filter or autoregressive operator for a time-invariant digitized data made available at smaller intervals has not been attempted. This problem is central to most measured data and is especially important in applications relating to the data available from reflection seismic, gravity, magnetic, resistivity, magnetotelluric used for prospecting for oil, mineral and water. The central problem is, therefore, to obtain a stable and accurate solution for an ill-conditioned system of normal equations assocaited with digital Weiner filter/or autoregressive operator or in general a prediction filter.

Treitel and Wang (1976) suggested a method of finding solution of an ill-conditioned system of normal equations by means of "pre-whitening". They advocate the replacement of zero-lag term $r_0$ of the auto-correlation coefficient sequence by a slightly larger number $r'_0$ such that:

$$r'_0 = r_0 + \Delta r_0$$

where $\Delta r_0$ is small compared to $r_0$. The replacement of $r_0$ by $r'_0$ results in a different system of normal equations. Treitel and Wang (1976) illustrated with examples that as the prewhitening levels used on the original ill-conditioned matrix increases, the condition number, which is a measure of ill conditioning, decreases. They observe that the percentage levels of prewhitening to be used depend, in part, on the numerical accuracy of the available computer. They also observe that more numerical computations on a given computer would be necessary if a closer estimate of such an "optimum" prewhitening level is desired. They also note, without proof that the addition of a small amount of white noise improves the conditioning of the linear system (O'Dowd, 1990).

Treitel and Wang (1976) advocate that the application of pre-whitening level to the coefficient matrix associated with an ill-conditioned system of normal equations to condition the coefficient matrix. A trade-off between the prewhitening levels and the condition numbers must be considered. Apparently, the compromise made between prewhitening level and condition number result in a system of normal equations, which may not be totally well conditioned, as some measure of ill conditioning would still persist in the system under treatment. O'Dowd (1990) observes that the application of prewhitening level is not an acceptable reason to make the change in the diagonal arbitrarily large.

Gram_Schmidt process of orthonormalisation has been used in the past to condition an ill-conditioned system of normal equations assocaited with the trend surface and to determine the trend-coefficients. Sarma and Selvaraj (1990) demonstrated the use of Gram_Schmidt process of orthonormalisation in the determination of trend-coefficients from an ill-conditioned system of normal equations assocaited with trend-surface analysis.

REFERENCES

1. Dimri, V. P., 1992. Deconvolution and Inverse Theory (Chapter 2), Elsevier Science Publishers, B. V., Amsterdam.
2. Franklin, J. N. 1970. Well-posed stochastic extension of ill-posed linear problems, J. Math. Annal. Appl., 31, 682–716.
3. O'Dowd, R. J., 1990, Ill-conditioning and pre-whitening in seismic deconvolution, Geophysics Journal Int., 101, 489–491.
4. Sarma, D. D. and Selvaraj, J. B., (1990) Two-dimensional orthonormal trend surfaces for prospecting, Computers & Geosciences, 16(7), 897–909.
5. Sarma, D. D. (1990) Stochastic Modelling of gold mineralization in the champion lode system of Kolar gold fields (India), Mathematical Geology, v.22(3), pp.231–279.
6. Sahu, B. K., (1982) Stochastic Modelling of mineral deposits, Mineralium Deposita, v.17, pp.97–103.
7. Treitel, S., and Wang, R. J., 1976. The determination of digital Weiner Filters from an ill-conditioned system of normal equations, Geophysical prospecting, 24, 317–327.
8. Ulrych, T. J., and Bishop, T. N., 1975. Maximum Entropy spectrum analysis and Autoregressive Decomposition, Reviews of Geophysics and Space Physics, vol.13, No.1, 183–200.
9. Westlake, J. R., 1968. A handbook of numerical matrix inversion and solution of linear equations, John Wiley and Sons, Inc.

SUMMARY OF THE INVENTION

The present invention relates to an advantageous and beneficial method wherein a stable and accurate solution can be obtained for an ill-conditioned system of normal equations assocaited with the prediction filter, viz., digital Wiener filter or an autoregressive operator whose observed output is defined as a time advanced version of the input, without prewhitening the coefficient matrix of the ill-conditioned system of normal equations. Particularly, the present invention that conditions the ill-conditioned coefficient matrix reducing it to an identity matrix is based on mathematical rationale and results in a simple, new system of normal equations, which yields a stable and accurate solution with computational ease. The results given in numerical examples and tables show precision and accuracy, which lead to correct inferences.

DESCRIPTION OF DRAWINGS AND TABLES

Table 1A: Shows the Eigen values extracted from the ill-conditioned coefficient matrix and the well-conditioned coefficient matrix for a set of Gravity anomaly data.

Table 1B: Shows the Eigen values extracted from the ill-conditioned coefficient matrix and the well-conditioned coefficient matrix for a set of Copper mineralization data.

Table 2A: Shows the autoregressive operator points obtained from an ill-conditioned system of normal equations and a well-conditioned system of normal equations for a set of Gravity anomaly data. The S.E.'s are the standard error of estimates yielded by the ill conditioned and the well-conditioned system of normal equations.

Table 2B: Shows the autoregressive operator points obtained from an ill conditioned and a well-conditioned system of normal equations for a set of copper mineralization data. The S.E.'s are the standard error of estimates yielded by the ill conditioned and the well-conditioned systems of normal equations.

FIG. 1: Shows the spectra resulted by Maximum entropy method (Yule-Walker scheme) based on (A) the autoregressive operator obtained from an ill-conditioned system of normal equations and (B) the autoregressive operator determined from a well conditioned of normal equations. The spectra shown are for a synthetic digitized data in which a numeral "1" is introduced at a distance of every 10 units. The expected peak in the spectrum is at frequency 0.10 hz. The spectrum represented by the continuous line is by well-conditioned system of normal equations. The spectrum represented by the dashed line is by the ill-conditioned system of normal equations. It is observed that the spectrum yielded by the well-conditioned system of normal equations has high resolution with a sharp peak at the expected frequency 0.10 hz, whereas the spectrum resulted by the ill-conditioned system of normal equations has poor resolution with a smooth crust at frequency 0.11.

FIG. 2: Shows the spectra for copper mineralization.
Spectrum 'A' is by Maximum entropy method (Yule-Walker scheme) based on the autoregressive operator obtained from an ill-conditioned system of normal equations.
Spectrum 'B' is by Maximum entropy method (Yule-Walker scheme) based on the autoregressive operator determined from the well-conditioned system of normal equations resulted by the said method.
The Spectrum 'A' has poor resolution and the periodicities are masked due to the effect of ill conditioning on the solution.
The Spectrum 'B' has high resolution with hidden periodicities assuming prominence.

FIG. 3: Shows the spectra for Gravity anomaly data.
Spectrum 'A' is by Maximum entropy method (Yule-Walker scheme) based on the auto-regressive operator obtained from the ill-conditioned system of normal equations.
Spectrum 'B' is by Maximum entropy method (Yule-Walker scheme) based on the autoregressive operator determined from the well-conditioned system of normal equations resulted by the said method.
The Spectrum 'A' has poor resolution and the periodicities are masked due to the effect of ill conditioning on the solution.
The Spectrum 'B' has high resolution with hidden periodicities becoming pronounced.

Figure 4:
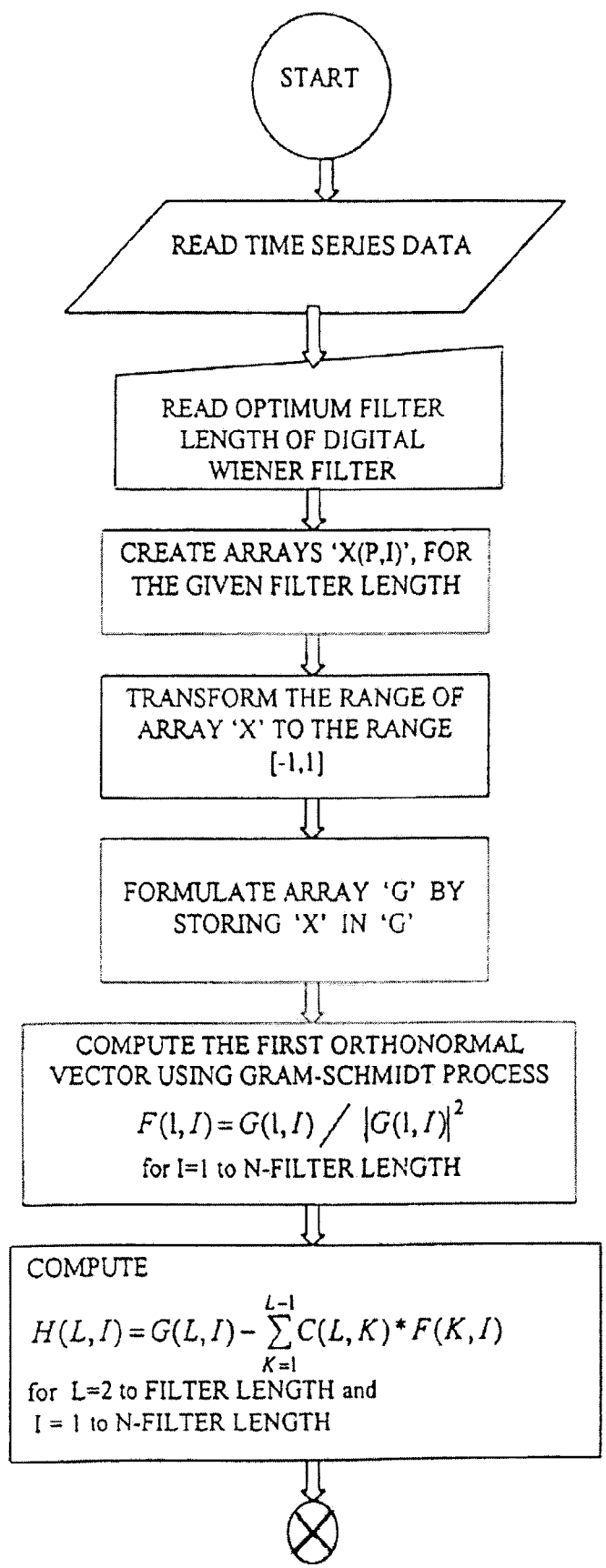
Figure 5:
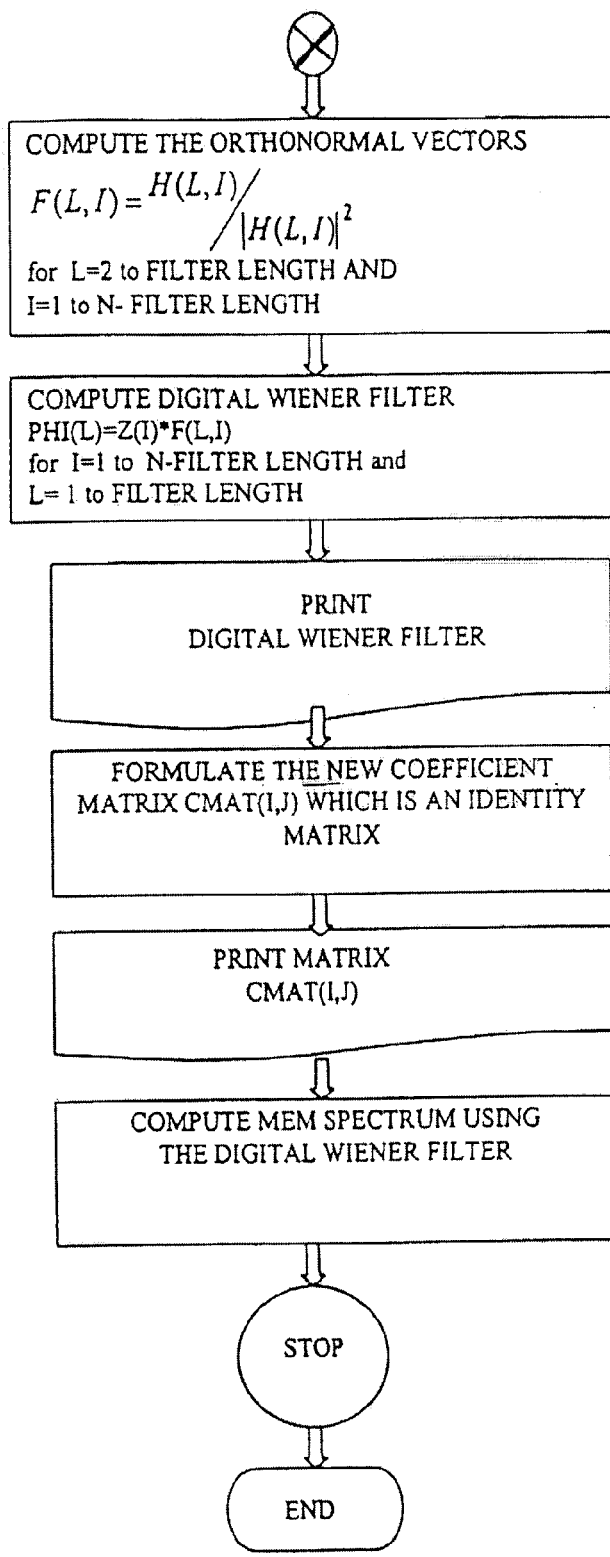

Flow Chart (FIGS. 4–5): A sequence of steps in the said method to condition an ill conditioned coefficient matrix of an ill conditioned system of normal equations associated with digital Wiener filter in time domain.

DETAILED DESCRIPTION OF THE INVENTION

Accordingly, the present invention provides a method for obtaining a stable and accurate solution for an ill-conditioned system of normal equations associated with a prediction filter whose observed output is defined as a time advanced version of the input using Gram_Schmidt process of orhthonormalisation comprising the steps of:

(a) obtaining a set of digitized data relating to a time-invariant system, storing the data in an array and eliminating arithmetic mean from the data to make it a zero mean process;
(b) determining the optimum filter length/optimum order of the autoregressive model;
(c) creating segments X(P,I) of the said digitized data from step (a) above, for I=1, N−M, P=1, M.;
(d) changing the range of X(P,I) to (−1,1);
(e) formulating the vectors $g_i(x_r)$'s (equation 7 in the "Detailed Description of the Invention) and deriving the system of normal equations in terms of $g_i(x_r)$'s;
(f) computing the orthonormal vectors of $f_i(x_r)$'s using Gram_Schmidt process of orthonormalisation;
(g) rewriting the system of normal equations in terms of the orthonormal vectors $f_i(x_r)$'s, and
(h) solving the new system of normal equations for determining the digital Weiner filter/autoregressive operator.

In an embodiment of the present invention, the source of the digitized data obtained in step (a) relates to a time-invariant system.

In another embodiment of the present invention, the step of conditioning an ill-conditioned system of normal equations is used for time-invariant digitized data obtained at smaller sampling intervals.

In yet another embodiment of the present invention, the source of obtaining time invariant digitized time series data is selected from reflection seismic, gravity, magnetic, resistivity, magnetotelluric.

In still another embodiment of the present invention, for obtaining a stable and accurate solution of an ill-conditioned system of normal equations associated with digital Weiner filter or autoregressive operator which are prediction filters whose observed output can be defined as a time advanced version of the input, results in an accurate and stable solution.

In one more embodiment, the present invention yields digital Weiner filter points and/or autoregressive operator that are accurate and the Maximum entropy spectrum based on Yule-Walker scheme is true and has high resolution.

In one another embodiment, the present invention gives accurate results in situations wherein a marginal measure of ill conditioning is present.

In a further embodiment, the present invention conditions the coefficient matrix associated with the ill-conditioned system of normal equations in respect of gravity data to an identity matrix whose eigen values are all equal to unity.

In an embodiment of the present invention, the Eigen values extracted from the ill-conditioned matrix for the above example are in the range 0.12 to 1.89.

In another embodiment of the present invention, the range of Eigen values extracted from the coefficient matrix associated with the ill-conditioned system of normal equations in respect of copper mineralization is 0.73 to 1.74.

In yet another embodiment of the present invention, the Eigen values extracted from the conditioned matrix, an identity matrix, are all equal and equivalent to unity.

In still another embodiment of the present invention, the optimum filter length/optimum order of the autoregressive model is determined using Akaike Final Prediction Error (FPE) criterion.

In one more embodiment of the present invention, wherein according to Akaike Final Prediction Error (FPE) criterion the filter length of the digital Weiner filter/the order of the autoregressive model is given as:

$$FPE(M) = \frac{N + (M+1)}{N - (M+1)} S_M^2$$

for a zero mean process; where N is the data length, M is the filter length/order of the autoregressive model, and $S_M^2$ is the residual sum of squares.

In one another embodiment of the present invention, the optimum order of the autoregressive model/optimum filter length is determined from a graph between M and FPE(M).

In an embodiment of the present invention, the value of M corresponding to the first minimum is chosen as the optimum filter length/order.

In another embodiment of the present invention, the entries in the coefficient matrix of the above system of normal equations are shown in terms of $g_i(x_t)$'s (refer equation 8 in the Detailed Description of the Invention).

In yet another embodiment of the present invention, a system of normal equations is said to be ill conditioned if the coefficient matrix associated with such a system is singular or ill conditioned.

There are several measures existing to test a matrix for ill conditioning. Such measures are called condition numbers. One particularly useful condition number is the ratio $$P = \left| \frac{\lambda_{max}}{\lambda_{min}} \right|$$

where $\lambda_{max}$ and $\lambda_{min}$ are, respectively, largest and smallest eigen values of the given matrix and where the vertical bars denote the magnitude of the number they enclose; the grater the value of P the more ill-conditioned is the matrix; in particular if $\lambda_{min}=0$, the matrix is singular and P becomes infinite. The said method does not include a step for testing the ill conditioning associated with the system of equations.

According to the general approach of Weiner theory to the deconvolution of seismic trace, the prediction filter i.e., digital Weiner filter is such that the filter acts on the input trace up to the time, say t, and estimates the trace amplitude at some future time t+α. So, we can define the observed output of the prediction filter as a time advanced version of the input $x_t$. The minimization of the mean squared error between a desired output $d_t$ and the actual output $x_t$ yields a system of normal equations (Dimri, 1992). In certain situations, the system of normal equations can become ill-conditioned.

In time series analysis, for a time invariant stochastic process, the appropriate model often employed is an autoregressive model. The prediction operator i.e., an autoregressive operator is such that the operator acts on the input time sequence up to time, say t and extrapolates the time sequence beyond a further time t+k. Therefore, we can define the observed output of the autoregressive operator as a time advanced version of the input $x_t$. The minimization of the mean squared error between the desired output $d_t$ and the actual output $x_t$ yields even in this case a system of normal equations. In some instances the system of normal equations can become ill conditioned in this context as well.

The system of normal equations assocaited with the digital Wiener filter in the time domain and the system of normal equations associated with an autoregressive model are, respectively, arrived at after minimizing the prediction error and, therefore, they are similar.

Hence, the sequence of steps in the said method for the determination of the digital Wiener filter is the same as that for an autoregressive operator.

Following is the sequence of steps in the case of autoregressive model:

Let us consider a $K^{th}$ order auto-regressive model:

$$x_t = \alpha_{k1} x_{t-1} + \alpha_{k2} x_{t-2} + \ldots + \alpha_{kk} x_{t-k} + a_t \qquad (1)$$

where $\alpha_{k1}, \alpha_{k2}, \ldots \alpha_{kk}$ constitute an auto-regressive operator, and $a_t$, white noise The autoregressive model may be rewritten in terms of $d_i(x_t)$'s as $$x_t = \sum_{i=1}^{K} \alpha_{ki} d_i(x_t) + a_t \qquad (2)$$

where $d_i(x_t) = x_{t-i}$

To solve for the unknowns $\alpha_{ki}$'s, least-square principle is used and the system of normal equations, when written in matrix notation is as follows:

$$\begin{bmatrix} \sum_{t=k+1}^{N} x_{t-1} x_{t-1} & \sum_{t=k+1}^{N} x_{t-1} x_{t-2} & \ldots & \sum_{t=k+1}^{N} x_{t-1} x_{t-k} \\ \sum_{t=k+1}^{N} x_{t-2} x_{t-1} & \sum_{t=k+1}^{N} x_{t-2} x_{t-2} & \ldots & \sum_{t=k+1}^{N} x_{t-2} x_{t-k} \\ \ldots & \ldots & \ldots & \ldots \\ \sum_{t=k+1}^{N} x_{t-1} x_{t-1} & \sum_{t=k+1}^{N} x_{t-k} x_{t-2} & \ldots & \sum_{t=k+1}^{N} x_{t-k} x_{t-k} \end{bmatrix}_{A} \begin{bmatrix} \alpha_{k1} \\ \alpha_{k2} \\ \ldots \\ \alpha_{kk} \end{bmatrix}_{\alpha} = \begin{bmatrix} \sum_{t=k+1}^{N} x_t x_{t-1} \\ \sum_{t=k+1}^{N} x_t x_{t-2} \\ \ldots \\ \sum_{t=k+1}^{N} x_t x_{t-k} \end{bmatrix}_{B} \qquad (3)$$

The coefficient matrix 'A' could be near singular in certain situations. The system of normal equations with a coefficient matrix which is near singular is termed ill conditioned.

Now, let us consider the $(ij)^{th}$ element of the matrix 'A' in equation (3)

$$\sum_{t=k+1}^{N} x_{t-i} x_{t-j} \qquad (4)$$

which can be written in terms of $d_i(x_t)$'s as $$\sum_{t=k+1}^{N} d_i(x_t)d_j(x_t) \quad (5)$$

Expanding (5), we have $$\sum_{t=k+1}^{N} = d_i(x_t)d_j(x_t) = d_i(x_{k+1})d_j(x_{k+1}) + d_i(x_{k+2})d_j(x_{k+2}) + \ldots + \quad (6)$$

$$d_i(x_N)d_j(x_N) = [d_i(x_{k+1}) \ d_i(x_{k+2}) \ \ldots \ d_i(x_N)] \begin{bmatrix} d_j(x_{k+1}) \\ d_j(x_{k+2}) \\ d_j(x_N) \end{bmatrix}$$

$$\Rightarrow g_i(x_t)g_j(x_t)$$

where $$g_i(x_t) = [d_i(x_{k+1}) \ d_i(x_{k+2}) \ \ldots \ d_i(x_N)],$$

$$g_j(x_t) = [d_j(x_{k+1}) \ d_j(x_{k+2}) \ \ldots \ d_j(x_N)] \quad (7)$$

Thus, $g_i(x_t)$ and $g_j(x_t)$ constitute two ordered (N–K) tuple of components, and hence they are vectors.

Now, let us rewrite the system of normal equations (3) in terms of $g_i(x_t)$'s $$\begin{pmatrix} g_1^2(x_t) & g_2(x_t)g_1(x_t) & \ldots & g_k(x_t)g_1(x_t) \\ g_1(x_t)g_2(x_t) & g_2^2(x_t) & \ldots & g_k(x_t)g_2(x_t) \\ \ldots & \ldots & \ldots & \ldots \\ \ldots & \ldots & \ldots & \ldots \\ g_1(x_t)g_k(x_t) & g_2(x_t)g_k(x_t) & \ldots & g_k^2(x_t) \end{pmatrix} \begin{pmatrix} \alpha_{k1} \\ \alpha_{k2} \\ \ldots \\ \ldots \\ \alpha_{kk} \end{pmatrix} = \quad (8)$$

$$\begin{pmatrix} g_1(x_t) \sum_{t=K+1}^{N} x_t \\ g_2(x_t) \sum_{t=K+1}^{N} x_t \\ g_k(x_t) \sum_{t=K+1}^{N} x_t \end{pmatrix}$$

The vectors $g_i(x_t)$'s are normally correlated. When the $g_i(x_t)$'s are highly correlated the system of normal equations (8) can become ill conditioned. Such a system of ill-conditioned normal equations can be conditioned by employing Gram-Schmidt process of orthonormalisation. The Gram_Schmidt process orthornormalises $g_i(x_t)$'s and yields orthonormal vectors $f_i(x_t)$'s, which when substituted in equations (8), for $g_i(x_t)$'s, totally eliminated the effects due to ill conditioning and yields a well-conditioned system of normal equations. The solution to the well-conditioned system of normal equations would be stable and accurate.

The Gram-Schmidt process of orthonormalisation is detailed below:

Gram_Schmidt Process of Orthonormalisation

Definition: A set of vectors $e_i(x_t), i=1$ to n is said to be a set of orthonormal vectors if the vectors are orthonormal to each other as:

$$\int_{-1}^{+1} e_i(x_t)e_j(x_t)dx = 1, \text{ for } i = j, \text{ and } 0 \text{ for } i \neq j$$

In the digitized case, we have $\Sigma e_i(x_t)e_j(x_t)=1$ for $i=j; i,j=0,1,\ldots, n=0$ for $i \neq j$;
$i,j=0,1,\ldots,n$ In vector notation:

$\{e_i(x_t)e_j(x_t)\}=1$ for $i=j=0$ for $i \neq j$

As the vectors $g_i(x_t)$ defined in (7) above are not uncorrelated, the system of linear equations (8) can become ill conditioned, and therefore, the autoregressive operator points from such a system of normal equations may not be accurate. Therefore, the vectors $g_i(x_t)$ are orthonormalised using Gram_Schmidt process. The Gram_Schmidt process results in orthonormal vectors, $f_i(x_t)$, of the original vectors $g_i(x_t)$.

The steps involved in the Gram_Schmidt process are:

The first unit vector $f_1(x_t)$ is written as:

$$f_1(x_t) = \frac{h_1(x_t)}{\|h_1(x_t)\|}, \text{ where } h_1(x_t) = g_1(x_t)$$

Therefore, $$f_1(x_t) = \frac{g_1(x_t)}{\|g_1(x_t)\|} = \frac{g_1(x_t)}{\sqrt{\sum g_1^2(x_t)}}$$

Generalizing, the unit vectors $f_j(x_t)$ may be written as:

$$f_j(x_t) = \frac{h_j(x_t)}{\|h_j(x_t)\|} = \frac{h_j(x_t)}{\sqrt{\sum h_j^2(x_t)}}$$

where, $$h_j(x_t) = g_j(x_t) - \sum_{k=1}^{j-1} c_{jk}f_k(x_t), j = 2, \ldots, k$$

and $$c_{jk} = \sum g_j(x_t)f_k(x_t)$$

The matrix equation (8) can be written in terms of orthonormal vectors $f_1(x_t), f_2(x_t), \ldots, f_k(x_t)$, as $$\begin{pmatrix} f_1(x_t)f_1(x_t) & f_2(x_t)f_1(x_t) & \cdots & f_k(x_t)f_1(x_t) \\ f_2(x_t)f_1(x_t) & f_2(x_t)f_2(x_t) & \cdots & f_k(x_t)f_2(x_t) \\ \ldots & \ldots & \ldots & \ldots \\ f_k(x_t)f_1(x_t) & f_k(x_t)f_2(x_t) & \cdots & f_k(x_t)f_k(x_t) \end{pmatrix} \quad (9)$$

$$\begin{pmatrix} \alpha'_{k1} \\ \alpha'_{k2} \\ \ldots \\ \alpha'_{kk} \end{pmatrix} = \begin{pmatrix} f_1(x_t) \sum x_t \\ f_2(x_t) \sum x_t \\ \ldots \\ f_k(x_t) \sum x_t \end{pmatrix}$$

As $f_i(x_t)$'s are orthonormal $f_i(x_t)f_j(x_t)=1$, for $i=j$, and $=0$ for $i \neq j$, the resultant system of normal equations becomes as shown below:

$$\begin{pmatrix} 10 & \dots & 0 \\ 01 & \dots & 0 \\ \dots & & \\ 0 & \dots & 1 \end{pmatrix} \begin{pmatrix} \alpha'_{k1} \\ \alpha'_{k2} \\ \dots \\ \alpha'_{kk} \end{pmatrix} = \begin{pmatrix} f_1(x_t) \sum_{t=k+1}^{N} x_t \\ f_2(x_t) \sum_{t=k+1}^{N} x_t \\ \dots \\ f_k(x_t) \sum_{t=k+1}^{N} x_t \end{pmatrix} \quad (10)$$

Thus, the new system of normal equations (10) is well conditioned, with an identity matrix as its coefficient matrix. Therefore, the solution for such a system of equations can be obtained with computational ease.

Therefore, the auto-regressive operator points are given by:

$\alpha'_{k1} = f_1(x_t) \Sigma x_t,$ $\alpha'_{k2} = f_2(x_t) \Sigma x_t,$ $\alpha'_{kk} = f_k(x_t) \Sigma x_t$ The maximum entropy spectrum based on Yule-Walker Scheme can be estimated by:

$$P(f) = \frac{p_{k+1}}{\left\| 1 + \sum_{j=1}^{m} \alpha'_{kj} \exp(-2\pi i f j \Delta_i) \right\|^2}$$

where P(f) is the power spectrum, f is the frequency, $\alpha_t$ is the sampling interval, $-\alpha'_{kj}$ are the autoregressive operator points.

EXAMPLE 1

A set of synthetic digitized data with a sampling interval of 1 m, and a numeral '1' at a distance of every 10 m, is used to illustrate the efficiency of the method. An autoregressive model is fitted to the data. The system of normal equations associated with the above model is found to be marginally ill conditioned with a condition number equivalent to 1.59. The condition number for the coefficient matrix associated with the well-conditioned system of normal equations obtained through the said method is unity.

The Maximum entropy spectrum is estimated based on the auto-regressive operator yielded by the marginally ill-conditioned system of normal equations is smeared, perhaps, due to some measure of ill-conditioning in the system. A crust is seen at frequency 0.11 hz.

The Maximum entropy spectrum is also obtained, based on the auto-regressive operator yielded by the well-conditioned system of normal equations, obtained through the said method. The spectrum obtained has a high resolution and a peak at the expected frequency 0.10 hz. (FIG. 1).

EXAMPLE 2

A set of spatial data from copper mineralization with a sampling interval of 1 m, is the second data set used to demonstrate the usefulness of the method. The system of normal equations associated with the autoregressive model, applied to the data, is found to be ill conditioned with a condition number equivalent to 2.40. The condition number for the coefficient matrix associated with the well-conditioned system of normal equations obtained through the said method is unity.

The Maximum entropy spectrum estimated based on the auto-regressive operator yielded by the ill-conditioned system of normal equations is smeared with hidden periodicities.

The Maximum entropy spectrum is also estimated based on the autoregressive operator yielded by the well-conditioned system of normal equations, obtained through the said method. The spectrum estimated, has a high resolution and the hidden periodicities taking prominence.

EXAMPLE 3

A set of digitized Gravity anomaly data from a specific area forms the third set to illustrate the efficiency of the method. An autoregressive model is fitted to the data set. The system of normal equations associated with the above model is found to be ill conditioned with a condition number equivalent to 15.5. The condition number for the coefficient matrix associated with the well-conditioned system of normal equations obtained through the said method is unity.

The Maximum entropy spectrum is estimated based on the autoregressive operator, yielded by the ill conditioned system of normal equations is smeared.

The Maximum entropy spectrum is also obtained based on the autoregressive operator yielded by the well-conditioned system of normal equations, obtained through the said method. The spectrum estimated has a high resolution with hidden periodicities taking prominence.

TABLE 1A

Eigen values relating to Gravity data.

| System of Equations | Order of the AR process | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | Cond. No. (max/min) |
|---|---|---|---|---|---|---|---|---|---|---|---|---|
| ill-conditioned | 10 | 0.12 | 0.20 | 0.68 | 0.98 | 0.99 | 1.01 | 1.03 | 1.18 | 1.88 | 1.89 | 15.5 |
| Well conditioned | 10 | 1 | 1 | 1 | 1 | 1 | 1 | 1 | 1 | 1 | 1 | 1 |

TABLE 1B

Eigen Values relating to Copper Mineralization data

| System of Equations | Order of the AR process | Eigen values | | | | Cond. No. (max/min) |
|---|---|---|---|---|---|---|
| | | $\lambda_1$ | $\lambda_2$ | $\lambda_3$ | $\lambda_4$ | |
| ill-conditioned | 4 | 0.73 | 0.75 | 0.78 | 1.74 | 2.40 |
| Well conditioned | 4 | 1 | 1 | 1 | 1 | 1 |

TABLE 2A

Autoregressive operator for gravity anomaly data

| System of Equations | Order of the AR process | Autoregressive operator | | | | | | | | | | S.E |
|---|---|---|---|---|---|---|---|---|---|---|---|---|
| | | $\alpha_{101}$ | $\alpha_{102}$ | $\alpha_{103}$ | $\alpha_{104}$ | $\alpha_{105}$ | $\alpha_{106}$ | $\alpha_{107}$ | $\alpha_{108}$ | $\alpha_{109}$ | $\alpha_{1010}$ | |
| ill-conditioned | 10 | 0.97 | 0.01 | 0.09 | −0.22 | −0.12 | −0.02 | 0.10 | 0.05 | −0.04 | 0.03 | 99.18 |
| well conditioned | 10 | 62.0 | 5.1 | −11.4 | −15.9 | −13.9 | 24.0 | 19.4 | 335.0 | −50.7 | 5.6 | 28.62 |

TABLE 2B

Autoregressive operator for copper mineralization data.

| System of Equations | Order of AR process | Autoregressive operator | | | | S.E |
|---|---|---|---|---|---|---|
| | | $\alpha_{41}$ | $\alpha_{42}$ | $\alpha_{43}$ | $\alpha_{44}$ | |
| ill-conditioned | 4 | 0.11 | 0.29 | 0.16 | 0.03 | 3.00 |
| well conditioned | 4 | 3.70 | 1.60 | −0.30 | −3.78 | 2.62 |

ADVANTAGES OF THE INVENTION

The method of invention yields accurate results which facilitates precise inference.

The coefficient matrix associated with the ill-conditioned system of normal equations associated with the prediction filter is reduced to an identity matrix, obviously, a non-singular matrix. The solution of the new system of normal equations is, thus, simplified.

The method is not based on prewhitening the coefficient matrix to condition it, which requires a trade-off to be considered between the prewhitening level and the condition number. The trade-off considered does not totally eliminate the effects due to the ill conditioning as some measure of ill conditioning may still persist in the system. The method of invention is based on a widely used numerical method, viz., Gram_Schmidt process of orhthonormalisation having a rational mathematical basis.

While only certain important features of the invention have been illustrated with examples, some changes can be incorporated by those skilled in the art. It is, therefore, to be understood that the appended claims are intended to cover all such changes as fall within the spirit of the invention. Thus, it is understood that the method for obtaining a stable and accurate solution may be used for time-invariant digitized data (obtained at smaller sampling intervals) relating to reflection seismic, gravity, magnetic, resistivity, electromagnetic and magnetotelluric. The results and analysis of time-invariant digitized data in the foregoing areas will be useful for prospecting of oil, mineral and water.

The invention claimed is:

1. A method for prospecting for natural resources in a time invariant geophysical system by obtaining a stable and accurate solution for an ill-conditioned system of normal equations associated with a prediction filter whose observed output is defined as a time advanced version of the input using Gram_Schmidt process of orthonormalisation comprising the steps of:
    (a) obtaining a set of digitized data relating to a time-invariant geophysical system, which have natural resources and stored in an array; and eliminating arithmetic mean from the data to make it a zero mean process;
    (b) determining the optimum filter length/optimum order of an autoregressive model;
    (c) creating segments X(P,I) of the said digitized data from step (a) above, for I=1, N−M, P=1, . . . M.;
    (d) changing the range of X(P,I) to (−1,1);
    (e) formulating the vectors $g_i(x_t)$'s, where $g_i(x_t)=[d_i(x_{k+1}) d_i(x_{k+2}) \ldots d_i(x_N)]$, and deriving the system of normal equations in terms of $g_i(x_t)$'s;
    (f) computing the orthonormal vectors of $f_i(x_t)$'s using Gram_Schmidt process of orthonormalisation;
    (g) rewriting the system of normal equations in terms of the orthonormal vectors $f_i(x_t)$'s,
    (h) solving the new system of normal equations for determining the digital Weiner filter or an autoregressive operator,
    (i) obtaining a spectrum output, and
    (j) applying the spectrum output to identifying the natural resources.

2. A method as claimed in claim 1 wherein the source of the digitized data obtained in step (a) relates to a time-invariant system.

3. A method as claimed in claim 1 wherein the step of conditioning an ill-conditioned system of normal equations is used for time-invariant digitized data obtained at smaller sampling intervals.

4. A method as claimed in claim 1 wherein the source of obtaining time invariant digitized time series data is selected from reflection seismic, gravity, magnetic, resistivity, magnetotelluric.

5. A method as claimed in claim 1 wherein the prediction filter is a digital filter or an auto regressive operator.

6. A method as claimed in claim 1,
    wherein the method yields digital Weiner filter or autoregressive operator points that are accurate and which possess high resolution and have true Maximum entropy spectrum based on Yule-Walker scheme.

7. A method as claimed in claim 1 gives accurate results in situations wherein a marginal measure of ill conditioning is present.

8. A method as claimed in claim 1 conditions the coefficient matrix associated with the ill-conditioned system of normal equations in respect of gravity data to an identity matrix whose eigen values are all equal to unity.

9. A method as claimed in claim 1, wherein the Eigen values extracted from the ill-conditioned matrix for the above example are in the range 0.12 to 1.89.

10. A method as claimed in claim 1, wherein the range of Eigen values extracted from the coefficient matrix associated with the ill-conditioned system of normal equations in respect of copper mineralization is 0.73 to 1.74.

11. A method as claimed in claim 1, wherein the Eigen values extracted from the conditioned matrix, obtained employing Gram-Schmidt process of orthonormalisation, are all equal and equivalent to unity; the result matrix is an identity matrix.

12. A method as claimed in claim 1, wherein the optimum filter length of the digital in or optimum order of the autoregressive model is determined using Akaike Final Prediction Error (FPE) criterion.

13. A method as claimed in claim 12, wherein according to Akaike Final Prediction Error (FPE) criterion the filter length of the digital Weiner filter/the order of the autoregressive model is given by:

$$FPE(M) = \frac{N + (M + 1)}{N - (M + 1)} S_M^2$$

for a zero mean process; wherein N is the data length, M is the filter length/order of the autoregressive model, and $S_M^2$ is the residual sum of squares.

14. A method as claimed in claim 1, wherein the optimum filter length of the Digital Weiner filter or optimum order of the auto-regressive operator is determined from a graph between FPE(M) vs N2.

15. A method as claimed in claim 1, wherein the value of M-the filter length, corresponding to the first minimum is chosen as the optimum filter length of the digital Weiner filter or optimum order of the autoregressive model.

* * * * *